US010059269B2

(12) United States Patent
Herman

(10) Patent No.: US 10,059,269 B2
(45) Date of Patent: Aug. 28, 2018

(54) SLIDING PACKAGE TRAY CARGO COVER

(71) Applicant: FORD GLOBAL TECHNOLOGIES, LLC, Dearborn, MI (US)

(72) Inventor: Joseph Walter Herman, Detroit, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 37 days.

(21) Appl. No.: 15/371,964

(22) Filed: Dec. 7, 2016

(65) Prior Publication Data

US 2018/0154836 A1   Jun. 7, 2018

(51) Int. Cl.
*B60R 99/00* (2009.01)
*B60R 5/04* (2006.01)
*B60P 7/04* (2006.01)
*B60R 13/01* (2006.01)
*B60R 13/02* (2006.01)

(52) U.S. Cl.
CPC ............... *B60R 5/044* (2013.01); *B60P 7/04* (2013.01); *B60R 5/04* (2013.01); *B60R 5/045* (2013.01); *B60R 13/011* (2013.01); *B60R 13/0237* (2013.01); *B60R 2013/0287* (2013.01)

(58) Field of Classification Search
CPC ............... B60R 5/044; B60R 13/0237; B60R 2013/0287
See application file for complete search history.

(56) References Cited

U.S. PATENT DOCUMENTS

| 5,037,154 A * | 8/1991 | Senba .................... B60R 5/044 296/37.1 |
| 6,546,598 B1 * | 4/2003 | Nakanou .................. B60R 5/04 108/44 |
| 6,733,060 B1 | 5/2004 | Pavkov et al. | |
| 6,779,824 B1 * | 8/2004 | Lazarevich ............ B60P 1/003 296/37.6 |
| 7,661,742 B2 | 2/2010 | Medlar et al. | |
| 8,172,295 B2 * | 5/2012 | Fischer .................. B60R 5/045 296/24.43 |
| 8,256,815 B2 | 9/2012 | Tosco | |

(Continued)

FOREIGN PATENT DOCUMENTS

EP        2105352 A1    12/2006

*Primary Examiner* — Lori L Lyjak
(74) *Attorney, Agent, or Firm* — Vichit Chea; King & Schickli PLLC

(57) ABSTRACT

A cargo area for a vehicle includes a load floor, a package tray, and a pair of cargo area side walls each comprising a package tray translating element including a vehicle-forward facing guide surface for translating the package tray between at least one deployed position at a spaced distance above the load floor and a stowed position on the load floor. Vehicle-forward upper and lower indents are disposed at spaced intervals along the vehicle-forward facing guide surface. A cooperating package tray retaining element includes vehicle-rearward upper and lower indents disposed on the cargo area side walls. A vehicle-forward edge of the package tray includes a follower element adapted for translating the package tray between the at least one deployed position and the stowed position. A vehicle-rearward edge of the package tray includes a retractable retaining element adapted to releasably and selectively engage the vehicle-rearward upper and lower indents.

20 Claims, 4 Drawing Sheets

(56) References Cited

U.S. PATENT DOCUMENTS

| | | |
|---|---|---|
| 8,870,257 B2 | 10/2014 | Tosco et al. |
| 9,090,210 B2 * | 7/2015 | Demma .................... B60R 5/04 |
| 9,248,782 B2 * | 2/2016 | Lopes .................... B60R 5/044 |
| 2006/0016840 A1 | 1/2006 | Svenson et al. |
| 2007/0188008 A1 * | 8/2007 | Furman .................. B60P 1/283 |
| | | 298/17 R |
| 2015/0001875 A1 | 1/2015 | Giorgis et al. |

* cited by examiner

SLIDING PACKAGE TRAY CARGO COVER

TECHNICAL FIELD

This disclosure relates generally to covers for vehicle cargo areas. More particularly, the disclosure relates to a gravity-assisted sliding package tray for a vehicle rear cargo area.

BACKGROUND

It is known to provide deployable coverings for cargo areas in vehicles, for example for the cargo areas of sport-utility vehicles (SUVs), hatchbacks, etc. Such cargo covers provide utility in hiding items held in the vehicle cargo area from view, reducing the likelihood of theft. Additionally, cargo covers serve to protect items held in the cargo area from, e.g., direct sunlight. For cargo covers configured as package trays, such covers also provide an advantage of allowing the user to place items on a top surface of the package tray as well as below on a load floor of the cargo area.

Conventional cargo area covers such as cargo shades, tonneau covers, and package trays are typically provided as part of an assembly comprising a separate panel attachable to a structure near a rear of a vehicle second or third seat row seatback, or alternatively attachable to a structure associated with the vehicle second or third seat row seatback. To stow such cargo area covers, particularly in the case of package trays and other solid panel-style covers typically the user must at least partially disassemble the assembly, i.e. remove the cargo area cover from its point of attachment for storage. This presents inconvenience to the user.

To solve this and other problems, the present disclosure relates to a package tray-style cargo cover for a vehicle that can be translated from a stowed to a deployed position and back again, all without requiring disassembly and/or removal of the package tray for storage.

SUMMARY

In accordance with the purposes and benefits described herein, in one aspect a cargo area for a vehicle is provided, comprising a load floor, a package tray, and a pair of cargo area side walls. Each cargo area side wall comprises a package tray translating element including a vehicle-forward facing guide surface for translating the package tray between at least one deployed position at a spaced distance above the load floor and a stowed position on the load floor. The package tray translating element further comprises vehicle-forward upper and lower indents disposed at spaced intervals along the vehicle-forward facing guide surface. Each cargo area side wall further comprises a cooperating package tray retaining element comprising vehicle-rearward upper and lower indents.

A vehicle-forward edge of the package tray includes a follower element adapted for translating the package tray between the at least one deployed position and the stowed position. The follower element comprises vehicle-forward facing guide surface followers disposed adjacent opposed corners of the vehicle-forward edge of the package tray. In turn, a vehicle-rearward edge of the package tray includes a retractable retaining element adapted to releasably and selectively engage the vehicle-rearward upper and lower indents.

In embodiments, the retractable retaining element comprises retractable pins disposed adjacent opposed corners of the vehicle-rearward edge of the package tray. The retractable retaining element may further include a center-mounted actuator disposed adjacent the vehicle-rearward edge of the package tray.

In another aspect, a trim panel for a vehicle cargo area side wall is provided, comprising a package tray translating element and a cooperating package tray retaining element as described above.

In yet another aspect, a translatable package tray for a vehicle cargo area is provided. A vehicle-forward edge of the package tray comprises a follower element adapted for translating the package tray between at least one deployed position and a stowed position. In turn, a vehicle-rearward edge of the package tray includes a retractable retaining element adapted to releasably and selectively engage the vehicle-rearward upper and lower indents.

The follower element comprises vehicle-forward facing guide surface followers disposed adjacent opposed corners of the vehicle-forward edge of the package tray. In embodiments, the vehicle-forward facing guide surface followers are selected from one of a roller, a track ball, and a sled. In embodiments, the retractable retaining element comprises retractable pins disposed adjacent opposed corners of the vehicle-rearward edge of the package tray. The retractable retaining element my further include a center-mounted actuator disposed adjacent the vehicle-rearward edge of the package tray. In embodiments, the center-mounted actuator is operatively connected to a rocker which in turn is operatively connected to the retractable pins.

In the following description, there are shown and described embodiments of the disclosed sliding package tray cargo cover. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed sliding package tray cargo cover, and together with the description serve to explain certain principles thereof. In the drawing.

Reference will now be made in detail to embodiments of the disclosed sliding package tray cargo cover, examples of which are illustrated in the accompanying drawing figures.

DETAILED DESCRIPTION

Figure 1:
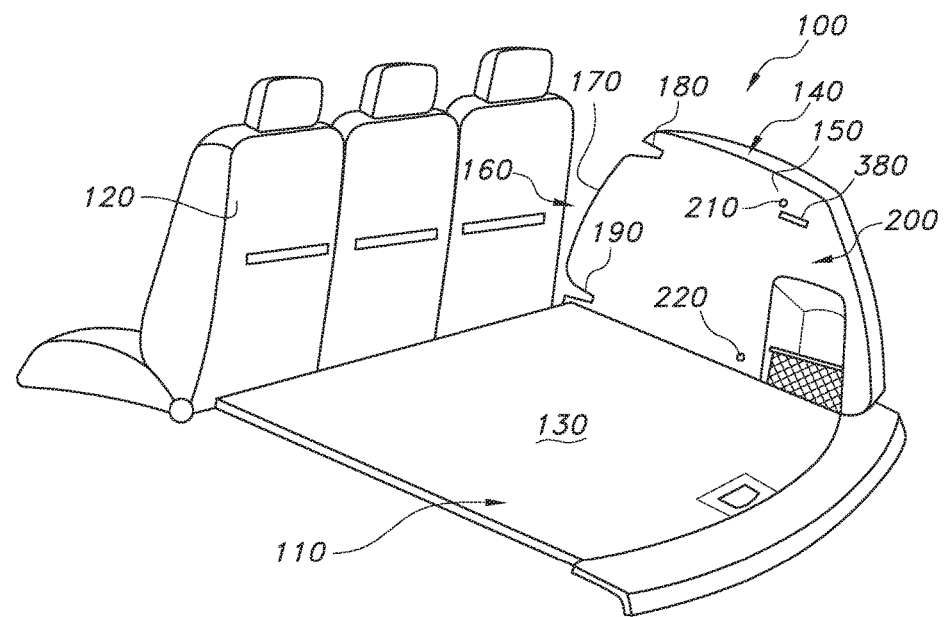
FIG. 1 depicts a vehicle including a rear cargo area having side walls configured for use with a sliding package tray cargo cover according to the present disclosure.

FIG. 1 shows a vehicle 100 including a sliding package tray cargo cover (not shown in this view) disposed in a rear cargo area 110 which in turn is positioned in the vehicle behind a row of seats 120. As shown, the rear cargo area 110 is defined by the row of seats 120, a load floor 130, and a pair of cargo area side walls 140 (only one cargo area side wall shown for convenience) configured or adapted for use with the sliding package tray cargo cover as will be described. A vehicle liftgate or other closure panel (not shown for convenience) is provided to enclose the rear cargo area 110.

Each cargo area side wall 140 is provided with features allowing translation of a sliding package tray cargo cover (not shown in this view) between a stowed position stacked on the load floor 130 and one or more deployed positions at a spaced distance from the load floor as will be described. As described herein, the features will be included as features associated with a cargo area side wall trim panel 150. However, the skilled artisan will also appreciate that in alternative embodiments the features may be associated directly with the cargo area side walls 140, for example integrally with or as bolt-on additions to the cargo area side walls, etc. Only one cargo area side wall trim panel 150 is shown in the drawing for convenience, but it will be appreciated that the features described thereon are mirrored in the opposed cargo area side wall trim panel 150 that is not specifically shown.

Figure 2:
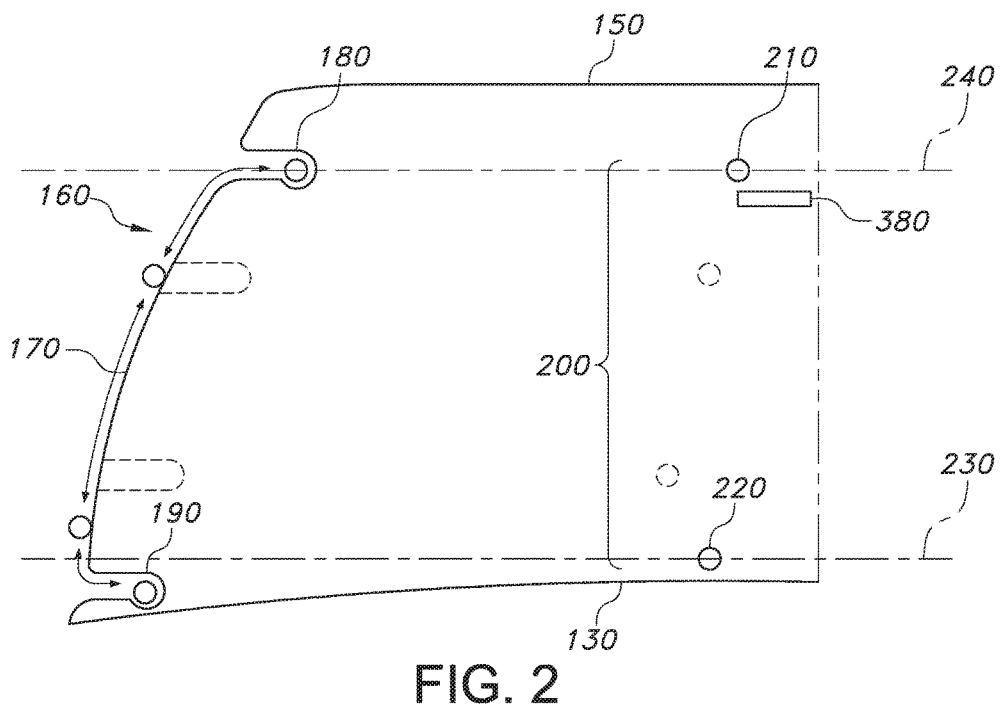
FIG. 2 shows a side view of a cargo area side wall trim panel according to the present disclosure.

As is shown more clearly in FIG. 2, each cargo area side wall trim panel 150 includes a translating element 160 comprising a vehicle-forward facing guide surface 170 extending between vehicle-forward upper indents 180 and lower indents 190. Each cargo area side wall trim panel 150 further includes a cooperating retaining element 200 comprising vehicle-rearward upper indents 210 and lower indents 220. This allows translating a package tray cargo cover (not shown) between a stowed position 230 on the cargo area load floor 130 and a deployed position 240 held at a spaced distance from the cargo area load floor. As will be appreciated, the translating element 160 may include additional indents (shown in broken lines) and the cooperating retaining element 200 may include additional upper indents (also shown in broken lines) to allow intermediate deployed positions.

Figure 3:
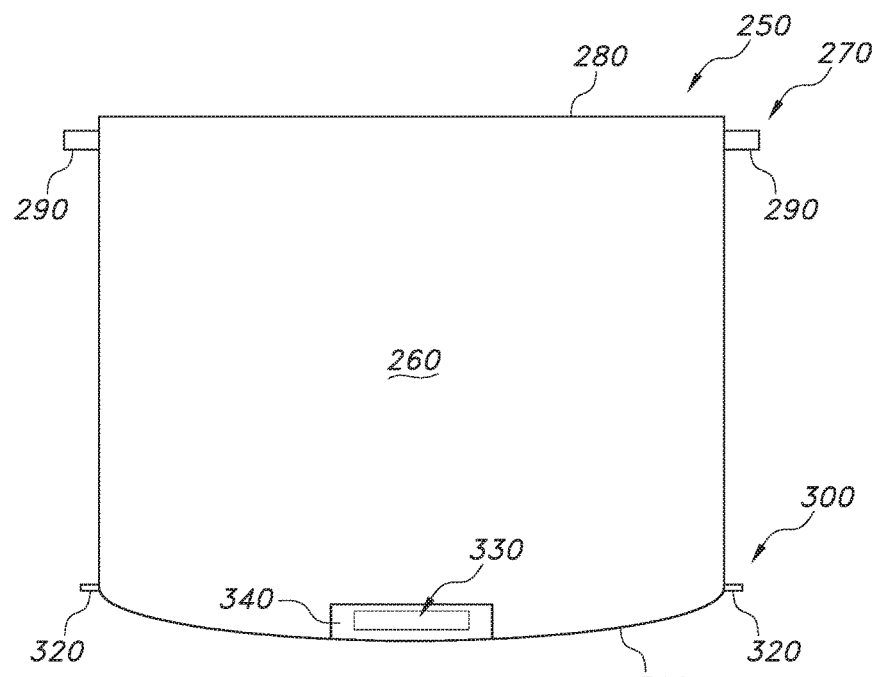
FIG. 3 shows a package tray cargo cover according to the present disclosure.

FIG. 3 shows a package tray cargo cover 250 adapted for use in the above-described system. As shown, the package tray cargo cover 250 includes a panel 260 fabricated of a suitably durable and rigid material as is known for package trays of this type. Non-limiting examples of such materials include various open- and closed-cell foams, various plastics and polymers, polyurethanes, BAYPREG (Covestro Deutschland AG, Leverkusen Germany), and others. The panel 260 may be covered with any suitable natural or synthetic material, for example a material such as a vinyl or a fabric matching a covering of an interior of the cargo area 110, to present a uniform, attractive, and aesthetic appearance.

The package tray cargo cover 250 includes a follower element 270 disposed adjacent a vehicle-forward edge 280. As will be appreciated, the follower element 270 is adapted to allow transitioning the package tray cargo cover 250 between the upper and lower indents 180, 190 along the vehicle-forward facing guide surface 170 of the cargo area side wall trim panel 150 to translate the panel 260 between the stowed position 230 and the deployed position 240. In the depicted embodiment, the follower element 270 comprises a pair of followers 290 disposed adjacent opposed vehicle-forward corners of the panel 260. The, the skilled artisan will appreciate that various embodiments are possible for the followers 290. For example, the followers 290 could be a pair of roller pegs which optionally may be covered or coated with a layer of rubber or other suitable polymer or plastic to enhance contact and so rotation of the roller pegs against the vehicle-forward facing guide surface 170. Alternatively, the followers could be part of a single roller traversing a width of the vehicle-forward edge 280 of the panel 260, track balls, sleds, or any suitable mechanism to allow a smooth translation of the panel 260 up/down the vehicle-forward facing guide surface 170.

The package tray cargo cover 250 also includes a retractable retaining element 300 disposed adjacent a vehicle-rearward edge 310 of the panel 260. In the depicted embodiment, the retractable retaining element 300 includes a pair of retractable pins 320 disposed adjacent the opposed vehicle-rearward corners of the panel 260. The retractable pins 320 are configured to engage the vehicle-rearward upper indents 210 and lower indents 220 to respectively retain the panel 260 in the stowed position 230 and the deployed position 240.

A number of mechanisms are contemplated to provide the retractable retaining element 300. For example, the retractable pins 320 may be separately actuated spring-loaded pins of a known design including a bracket, a translatable pin, and a spring configured to urge the pin into an extended position (embodiment not shown). More conveniently, the retractable pins 320 may be configured for concurrent retraction/extension by way of an actuator 330 comprising a handle 340 associated with a release mechanism (not shown in this view).

Figure 4:
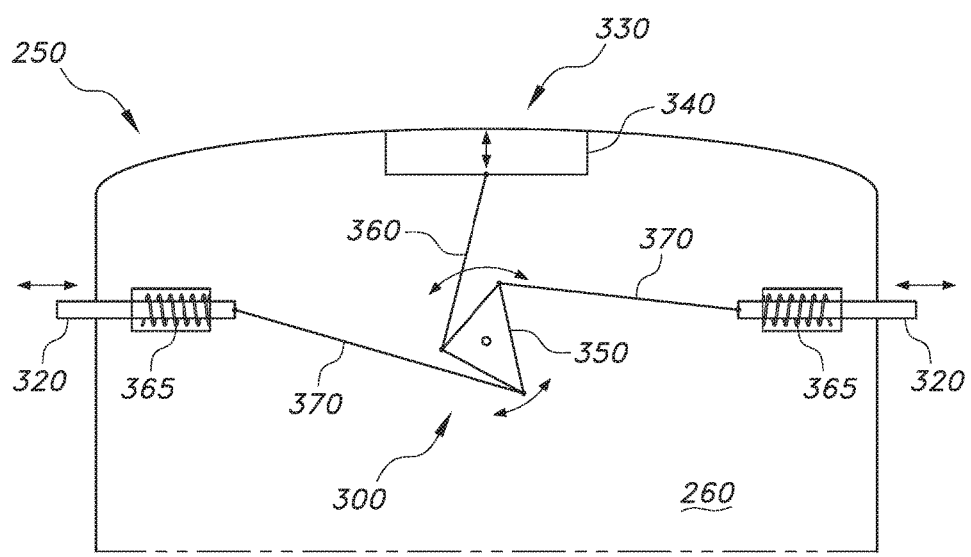
FIG. 4 shows an example of a retractable retaining element for use with the package tray cargo cover of FIG. 3.

One non-limiting example of such a mechanism is shown in FIG. 4, wherein is depicted a cutaway view of the package tray cargo cover 250 to show a the retractable retaining element 300 comprising a pivoting rocker 350 operatively connected to the actuator 330 by way of a cable or rod 360. The pivoting rocker 350 is also operatively connected to spring 365—actuated retractable pins 320 by way of cables or rods 370. As is known for such mechanisms, actuating the actuator 330 by way of handle 340 causes the pivoting rocker 350 to pivot under the pulling influence of cable or rod 360. This in turn pulls the cables or rods 370 panel 260—inwardly, retracting the retractable pins 320 and placing the springs 365 under tension. When the user releases the handle 340, the springs 365 uncoil, biasing the retractable pins 320 outwardly.

Figure 5A:
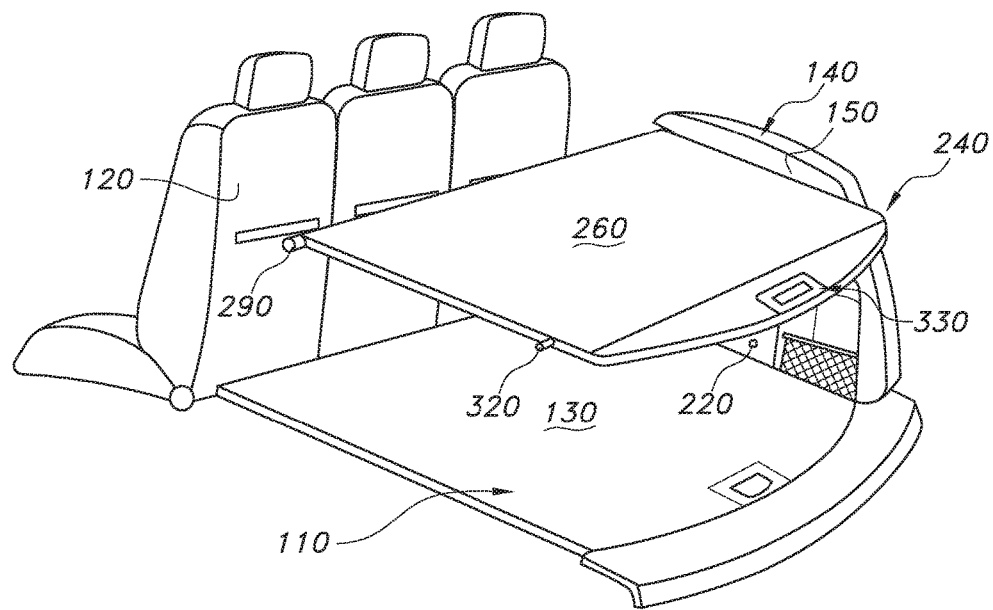
FIG. 5A shows the sliding package tray cargo cover of FIG. 1 in a deployed position.

Use of the sliding package tray cargo cover 250 will now be described. FIG. 5A shows the sliding package tray cargo cover 250 in the deployed position 240, with the followers 290 resting within the vehicle-forward upper indents 180 and the retractable pins 320 engaging the vehicle-rearward upper indents 210. In this position, a user can place items on an upper surface of the panel 260, and can also place items on an upper surface of the load floor 130 where they will be concealed from sight by the panel.

Figure 5B:
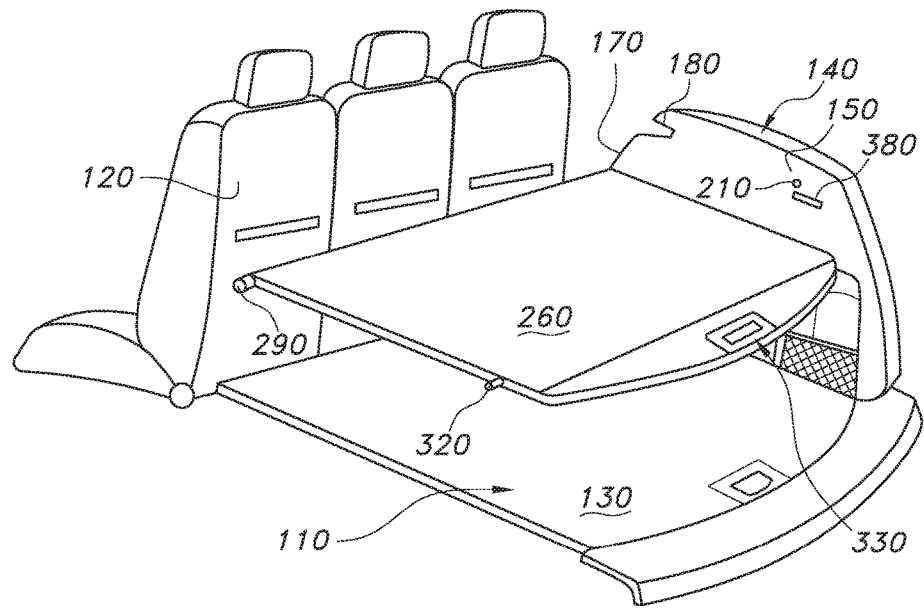
FIG. 5B shows the sliding package tray cargo cover of FIG. 5A in an intermediate position.
Figure 5C:
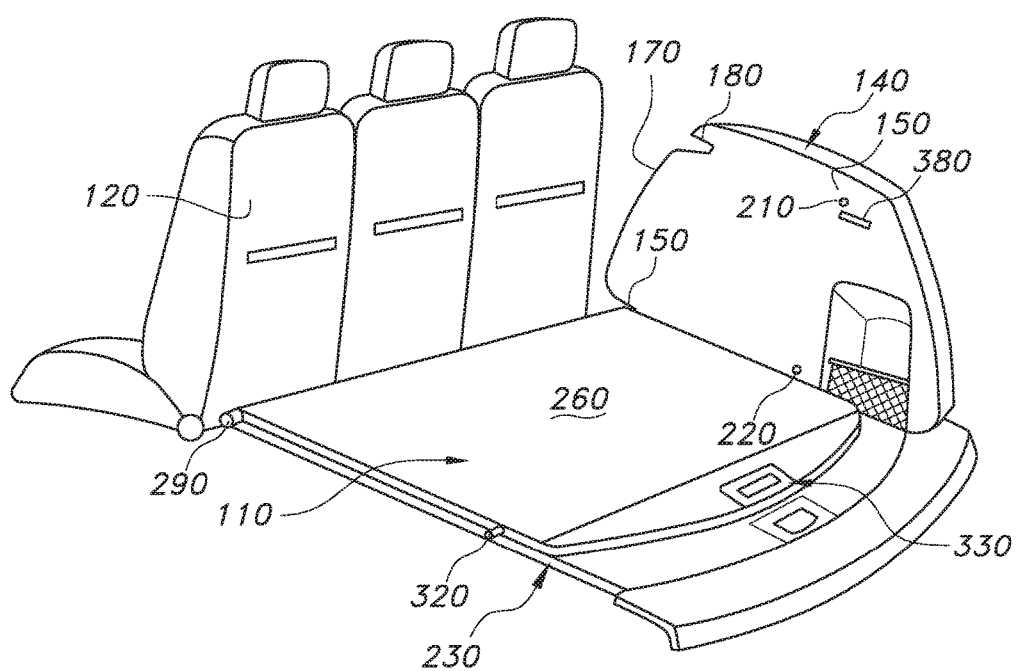
FIG. 5C shows the sliding package tray cargo cover of FIG. 5A in a stowed position.

When the user desires to move the panel 260 to the stowed position 230 (see FIG. 5C), she merely needs to use actuator 330 as described above to disengage the retractable pins 320 from the vehicle-rearward upper indents 210 and urge the panel 260 vehicle-forwardly to displace the followers 290 from the vehicle-forward upper indents 180. By the action of gravity, the panel 260 followers 290 will translate downwardly towards the load floor 130 along the vehicle-forward facing guide surface 170 (see FIG. 5B).

Once the panel 260 reaches the stowed position 230 resting on the load floor 130, the user need only urge the panel vehicle-rearwardly whereby the followers 290 engage the vehicle-forward lower indents 190. Then, the user can release the actuator 330, causing the retractable pins 320 to be biased outwardly as described above to engage the vehicle-rearward lower indents 220.

An optional support flange 380 (see FIGS. 1 and 2) could be provided in the cargo area side wall 140 or trim panel 150 substantially at the deployed position 240 to provide support for the sliding package tray cargo cover 250 when in the deployed position. The support flange 380 could be positioned substantially at or under the vehicle-rearward upper indent 210 and extending vehicle rearwardly as shown. It would then be possible for a user to tether the sliding package tray cargo cover 250 to a vehicle liftgate (not shown) for raising and lowering concurrently with the liftgate in order to access the space below the sliding package tray cargo cover.

When the user desired to lower the sliding package tray cargo cover 250 to the stowed position 230, she would merely need to untether the sliding package tray cargo cover and lower it as described above. On releasing the retractable pins 320 from the vehicle-rearward upper indents 210 and urging the panel 260 vehicle-forwardly to displace the followers 290 from the vehicle-forward upper indents 180, it will be appreciated that the panel vehicle-rearward edge 310 will clear the abbreviated support flange 380, allowing lowering of the panel as described.

By the features discussed above, the described sliding package tray cargo cover 250 may be easily and conveniently translated between the stowed position 230 for use as a load floor and the deployed position 240 for use as a cargo cover, all without any need to disassemble any portion of the device or indeed to separate it from the cargo area side wall 140/trim panel 150. In the stowed position 230 storage space for cargo in the cargo area 110 is maximized. In the deployed position 240 items placed on the load floor 130 of the cargo area 110 are hidden from view, increasing security.

Obvious modifications and variations are possible in light of the above teachings. For example, while the disclosed sliding package tray cargo cover 250 is shown in use in a vehicle such as a sport-utility or crossover-utility vehicle including an enclosed rear cargo area, it will be appreciated that the cargo cover is equally adaptable to any vehicle cargo area, for example a truck load bed, a hatchback cargo area, a station wagon cargo area, etc. All such modifications and variations are within the scope of the appended claims when interpreted in accordance with the breadth to which they are fairly, legally and equitably entitled.

What is claimed:

1. A cargo area for a vehicle, comprising:
   a load floor;
   a package tray; and
   a pair of cargo area side walls each comprising a package tray translating element including a cargo area-forward guide surface for translating the package tray between at least one deployed position at a spaced distance above the load floor and a stowed position on the load floor.

2. The cargo area of claim 1, further comprising upper and lower indents disposed at spaced intervals along the cargo area-forward guide surface.

3. The cargo area of claim 1, wherein each cargo area side wall further comprises a cooperating package tray retaining element comprising vehicle-rearward upper and lower indents.

4. The cargo area of claim 1, wherein a forward edge of the package tray includes a follower element adapted for translating the package tray between the at least one deployed position and the stowed position.

5. The cargo area of claim 4, wherein the follower element comprises guide surface followers disposed adjacent opposed corners of the forward edge of the package tray.

6. The cargo area of claim 3, wherein a rearward edge of the package tray includes a retractable retaining element adapted to releasably and selectively engage the vehicle-rearward upper and lower indents.

7. The cargo area of claim 6, wherein the retractable retaining element comprises retractable pins disposed adjacent opposed corners of the rearward edge of the package tray.

8. The cargo area of claim 6, wherein the retractable retaining element further includes a center-mounted actuator disposed adjacent the rearward edge of the package tray.

9. A vehicle including the cargo area of claim 1.

10. A trim panel for a vehicle cargo area side wall, comprising a package tray translating element including a cargo area-forward guide surface for translating the package tray between at least one deployed position at a spaced distance above a cargo area load floor and a stowed position on the cargo area load floor.

11. The trim panel of claim 10, further comprising upper and lower indents disposed at spaced intervals along the cargo area-forward guide surface.

12. The trim panel of claim 10, further comprising a cooperating package tray retaining element comprising vehicle-rearward upper and lower indents.

13. A vehicle including the trim panel of claim 10.

14. A cargo area cover assembly for a vehicle, comprising:
   a load floor;
   a pair of cargo area side walls each comprising a translating element defined by a cargo area-forward guide surface for translating the package tray between at least one deployed position at a spaced distance above the load floor and a stowed position on the load floor; and
   a package tray having a forward edge comprising a follower element adapted for translating the package tray between the at least one deployed position and the stowed position.

15. The cargo area of claim 14, further comprising upper and lower indents disposed at spaced intervals along the cargo area-forward guide surface.

16. The cargo area of claim 14, wherein each cargo area side wall further comprises a cooperating package tray retaining element defined by vehicle-rearward upper and lower indents.

17. The cargo area of claim 14, wherein the follower element comprises guide surface followers disposed adjacent opposed corners of the forward edge.

18. The cargo area of claim 16, wherein a rearward edge of the package tray includes a retractable retaining element adapted to releasably and selectively engage the vehicle-rearward upper and lower indents.

19. The cargo area of claim 18, wherein the retractable retaining element comprises retractable pins disposed adjacent opposed corners of the rearward edge.

20. The cargo area of claim 18, wherein the retractable retaining element further includes a center-mounted actuator disposed adjacent the vehicle-rearward edge of the package tray.

* * * * *